(12) United States Patent
Huang

(10) Patent No.: US 11,698,183 B1
(45) Date of Patent: Jul. 11, 2023

(54) STAGE LIGHT WITH ELECTRONICALLY ADJUSTABLE LIGHTING EFFECTS

(71) Applicant: FOSHAN YIFENG ELECTRIC INDUSTRIAL CO., LTD., Foshan (CN)

(72) Inventor: Ta-Che Huang, Foshan (CN)

(73) Assignee: FOSHAN YIFENG ELECTRIC INDUSTRIAL CO., LTD., Foshan (CN)

( * ) Notice: Subject to any disclaimer, the term of this patent is extended or adjusted under 35 U.S.C. 154(b) by 0 days.

(21) Appl. No.: 17/727,520

(22) Filed: Apr. 22, 2022

(51) Int. Cl.
*F21V 14/00* (2018.01)
*F21V 23/00* (2015.01)
*F21V 29/71* (2015.01)
*G02F 1/1335* (2006.01)
*F21W 131/406* (2006.01)
*F21V 29/67* (2015.01)

(52) U.S. Cl.
CPC .......... *F21V 14/003* (2013.01); *F21V 23/008* (2013.01); *F21V 29/713* (2015.01); *G02F 1/133628* (2021.01); *F21V 29/677* (2015.01); *F21W 2131/406* (2013.01)

(58) Field of Classification Search
CPC ............ F21W 2131/406; F21V 14/003; F21V 23/003; F21V 23/008; F21V 29/713; F21V 29/677; G02F 1/133618; G02F 1/133628
See application file for complete search history.

(56) References Cited

U.S. PATENT DOCUMENTS

| 5,764,316 A * | 6/1998 | Takizawa | G02F 1/1334 349/1 |
| 11,473,758 B1 * | 10/2022 | Peng | F21V 29/70 |
| 2002/0015305 A1 * | 2/2002 | Bornhorst | G02F 1/133385 362/264 |
| 2008/0284924 A1 * | 11/2008 | Hofmann | G02F 1/1333 349/5 |

(Continued)

FOREIGN PATENT DOCUMENTS

| CN | 106949416 A | * | 7/2017 | |
| DE | 20313626 U1 | * | 1/2004 | ............ F21V 14/003 |

(Continued)

*Primary Examiner* — Erin Kryukova
(74) *Attorney, Agent, or Firm* — Che-Yang Chen; Law Office of Michael Chen

(57) ABSTRACT

A stage light with electronically adjustable lighting effects comprises a light box with a heat dissipation mechanism, a heat dissipation hole formed on a rear side communicating with the mechanism, and a light panel disposed on a front side; a dimmable glass disposed on the light panel, comprising an outer glass layer and liquid crystal molecules; and a control box disposed on the light box and having a control circuit electrically connected to the glass, the control circuit comprises a central processing unit, a voltage regulating unit and a signal receiving unit, the signal receiving unit receives a digital multiplexing signal and transmits it to the central processing unit that generates a voltage adjustment command through the signal and transmits the command to the voltage regulating unit, the voltage regulating unit controls arrangement of the liquid crystal molecules through the command to change a light transmittance of the glass.

10 Claims, 11 Drawing Sheets

(56) References Cited

U.S. PATENT DOCUMENTS

| | | | | |
|---|---|---|---|---|
| 2011/0170296 A1* | 7/2011 | Heise | ................... | F21V 14/003 |
| | | | | 362/294 |
| 2016/0040866 A1* | 2/2016 | Quadri | ................... | F21V 29/67 |
| | | | | 362/373 |

FOREIGN PATENT DOCUMENTS

| | | | | |
|---|---|---|---|---|
| EP | 2014969 A1 * | 1/2009 | .............. | F21V 15/01 |
| WO | WO-03025454 A1 * | 3/2003 | ................ | F21S 8/00 |

* cited by examiner

US 11,698,183 B1

STAGE LIGHT WITH ELECTRONICALLY ADJUSTABLE LIGHTING EFFECTS

BACKGROUND OF THE INVENTION

Field of Invention

The invention relates to a stage light, and more particularly to a stage light with electronically adjustable lighting effects.

Related Art

Stage lighting is a very important equipment for the stage effect of stage performances, so stage lights are often seen on the concert stage or other performance stages. It is mainly through the lighting effects generated by stage lights to make the event displayed with different visual and lighting effects. Mainly through multiple light source generating units, stage lights generate light sources in a regular or irregular manner to achieve lighting effects.

In order to improve the use of stage lights, many manufacturers use conventional control methods to adjust the brightness of stage lights to make the light softer, thereby improving the application scenarios of stage lights. Therefore, in the prior art, different atomizing sheets are used to adjust the light transmittance in order to adjust the lighting effects of stage lights. In order to meet different requirements, manufacturers need to add different atomizing sheets by assembling manually on the spot, or disassembling the assembled atomizing sheets manually on the spot. However, this method of changing lighting effect is time-consuming and laborious, and the stage lighting effect cannot be displayed instantly. Moreover, with addition of the atomizing sheets, although the lighting effect of stage lights can be changed, the stage lights will generate a large amount of heat energy, and the heat energy cannot be effectively discharged, which will affect the effect of using the stage lights.

SUMMARY OF THE INVENTION

Therefore, in order to effectively solve the above-mentioned problems, a main object of the invention is to provide a stage light with electronically adjustable lighting effects capable of directly controlling a degree of glass atomization to solve the trouble of manual disassembly and assembly and capable of displaying stage lighting effects instantly.

Another object of the invention is to provide a stage light with electronically adjustable lighting effects capable of effectively conducting heat and discharging heat energy.

In order to achieve the above objects, the invention provides a stage light with electronically adjustable lighting effects, comprising a light box, inside the light box is formed with a front accommodating chamber and a heat dissipation mechanism is disposed in the front accommodating chamber, at least one heat dissipation hole is formed on a rear side of the light box to communicate with the heat dissipation mechanism, a light-emitting side is formed on a front side of the light box and a light panel is disposed at a position of the light-emitting side; a dimmable glass, the dimmable glass is disposed on a front side of the light panel, the dimmable glass comprises at least one outer glass layer and a plurality of liquid crystal molecules, the liquid crystal molecules are disposed between the outer glass layers; and a control box, the control box is disposed on the rear side of the light box, a rear accommodating chamber is formed in the control box, a control circuit electrically connected to the dimmable glass is disposed in the rear accommodating chamber, the control circuit is provided with a central processing unit, a voltage regulating unit and a signal receiving unit that are electrically connected to one another, the signal receiving unit receives a digital multiplexing signal and transmits the digital multiplexing signal to the central processing unit, the central processing unit generates a voltage adjustment command through the digital multiplexing signal and transmits the voltage adjustment command to the voltage regulating unit, the voltage regulating unit controls an arrangement of the liquid crystal molecules through the voltage adjustment command to change a light transmittance of the dimmable glass, so that an illumination angle of a light source of the light panel is controlled to be between 3 degrees and 60 degrees by the light transmittance of the dimmable glass, and the heat dissipation mechanism discharges a heat energy generated by the light panel through the heat dissipation hole.

According to one embodiment of the stage light with electronically adjustable lighting effects of the invention, wherein the heat dissipation mechanism comprises a heat-conducting plate, a heat-dissipating module and at least one heat-dissipating fan, the heat-conducting plate is attached to the light panel, and the heat-dissipating module is attached to another side of the heat-conducting plate opposite to the light panel.

According to one embodiment of the stage light with electronically adjustable lighting effects of the invention, wherein the heat-dissipating fan is disposed on a front side of the heat dissipation hole, the heat-conducting plate absorbs a heat energy of the light panel and transmits the heat energy to the heat-dissipating module, and the heat-dissipating fan discharges the heat energy of the heat-dissipating module through the heat dissipation hole.

According to one embodiment of the stage light with electronically adjustable lighting effects of the invention, wherein at least one air inlet channel is formed between an upper side of the light box and a lower side of the control box, and the air inlet channel communicates with the front accommodating chamber.

According to one embodiment of the stage light with electronically adjustable lighting effects of the invention, wherein the rear side of the light box is provided with at least one shielding grid member at a position of the heat dissipation hole.

According to one embodiment of the stage light with electronically adjustable lighting effects of the invention, wherein the dimmable glass further comprises at least one dimming layer and at least one electroconductive coating layer, the dimming layer is attached to the outer glass layer, the electroconductive coating layer is electrically connected to the voltage regulating unit and attached to another side of the dimming layer opposite to the outer glass layer, and the liquid crystal molecules are disposed between the electroconductive coating layers.

According to one embodiment of the stage light with electronically adjustable lighting effects of the invention, wherein a handle is provided on a top of the control box, and two ends of the handle are assembled on two sides of the control box.

According to one embodiment of the stage light with electronically adjustable lighting effects of the invention, wherein at least one locking member is disposed on a side of the handle, and the locking member comprises a rotating knob, a pressing member and a rotating stud.

According to one embodiment of the stage light with electronically adjustable lighting effects of the invention, wherein at least one recess and at least one hook are formed on a side of the light box, and the hook is accommodated in the recess.

According to one embodiment of the stage light with electronically adjustable lighting effects of the invention, wherein a thickness of the outer glass layer is between 1.2 mm and 12 mm, thicknesses of the liquid crystal molecules, the dimming layer and the electroconductive coating layer are respectively between 0.6 mm and 2 mm, and a voltage adjustment range of the voltage regulating unit is between 0V and 60V.

DETAILED DESCRIPTION OF THE INVENTION

The above objects of the invention, as well as its structural and functional features, will be described in accordance with the preferred embodiments of the accompanying drawings.

In the following, for the formation and technical content related to a stage light with electronically adjustable lighting effects of the invention, various applicable examples are exemplified and explained in detail with reference to the accompanying drawings; however, the invention is of course not limited to the enumerated embodiments, drawings, or detailed descriptions.

Furthermore, those who are familiar with this technology should also understand that the enumerated embodiments and accompanying drawings are only for reference and explanation, and are not used to limit the invention; other modifications or alterations that can be easily implemented based on the detailed descriptions of the invention are also deemed to be within the scope without departing from the spirit or intention thereof as defined by the appended claims and their legal equivalents.

And, the directional terms mentioned in the following embodiments, for example: "above", "below", "left", "right", "front", "rear", etc., are only directions referring in the accompanying drawings. Therefore, the directional terms are used to illustrate rather than limit the invention. In addition, in the following embodiments, the same or similar elements will be labeled with the same or similar numerals.

Figure 1:
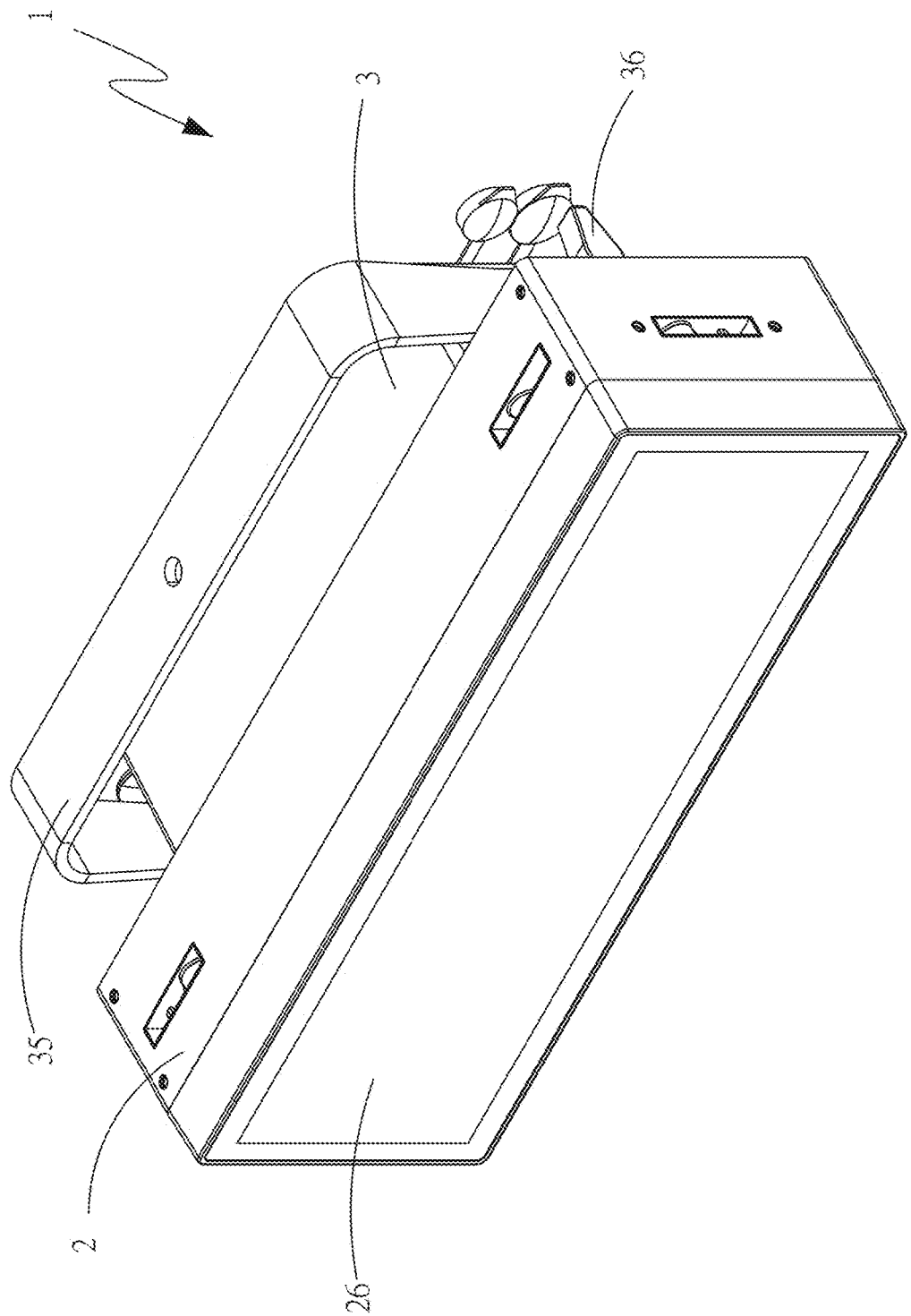
FIG. 1 is a perspective assembly view of a stage light with electronically adjustable lighting effects of the invention.
Figure 2:
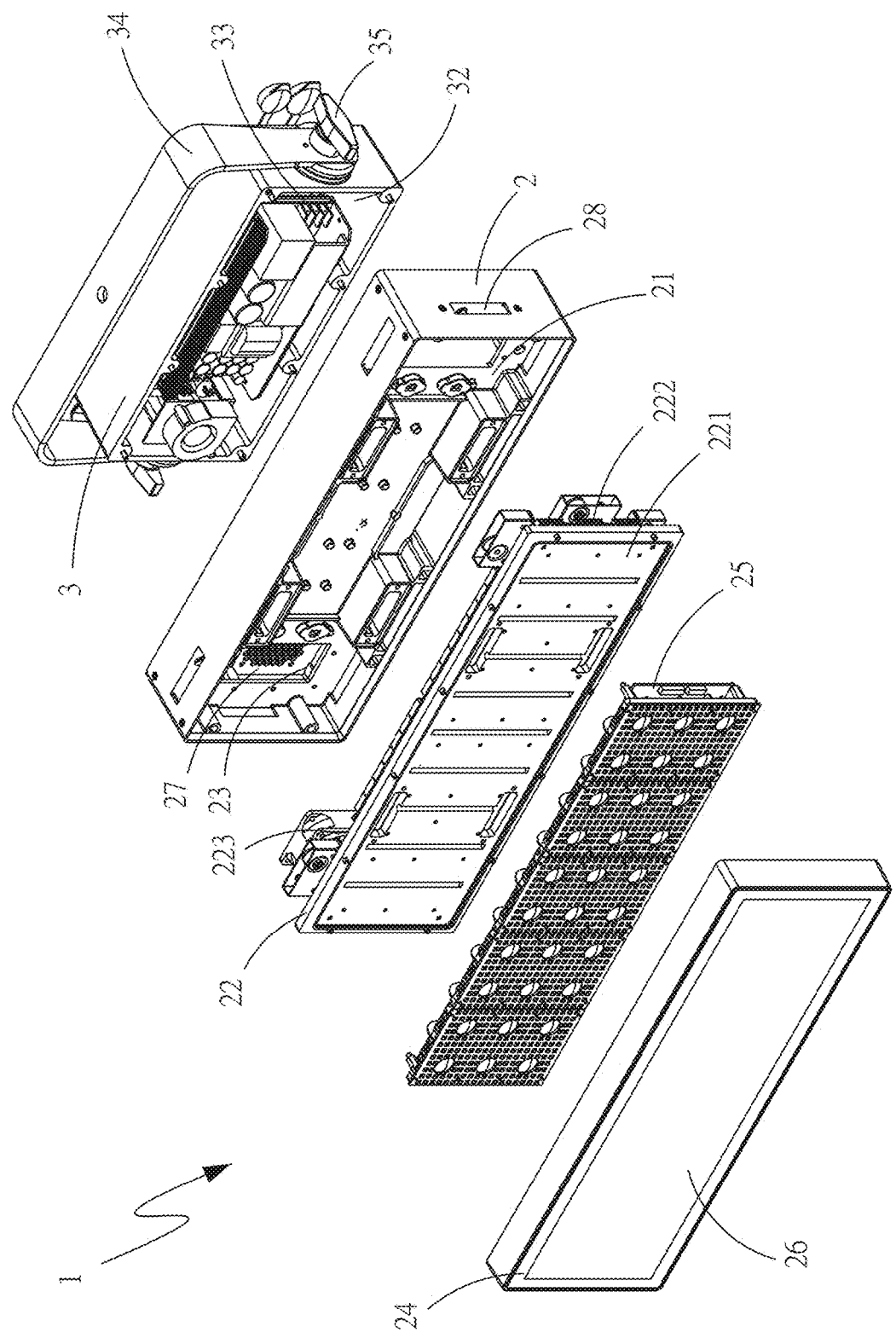
FIG. 2 is an exploded perspective view of the stage light with electronically adjustable lighting effects of the invention.
Figure 3:
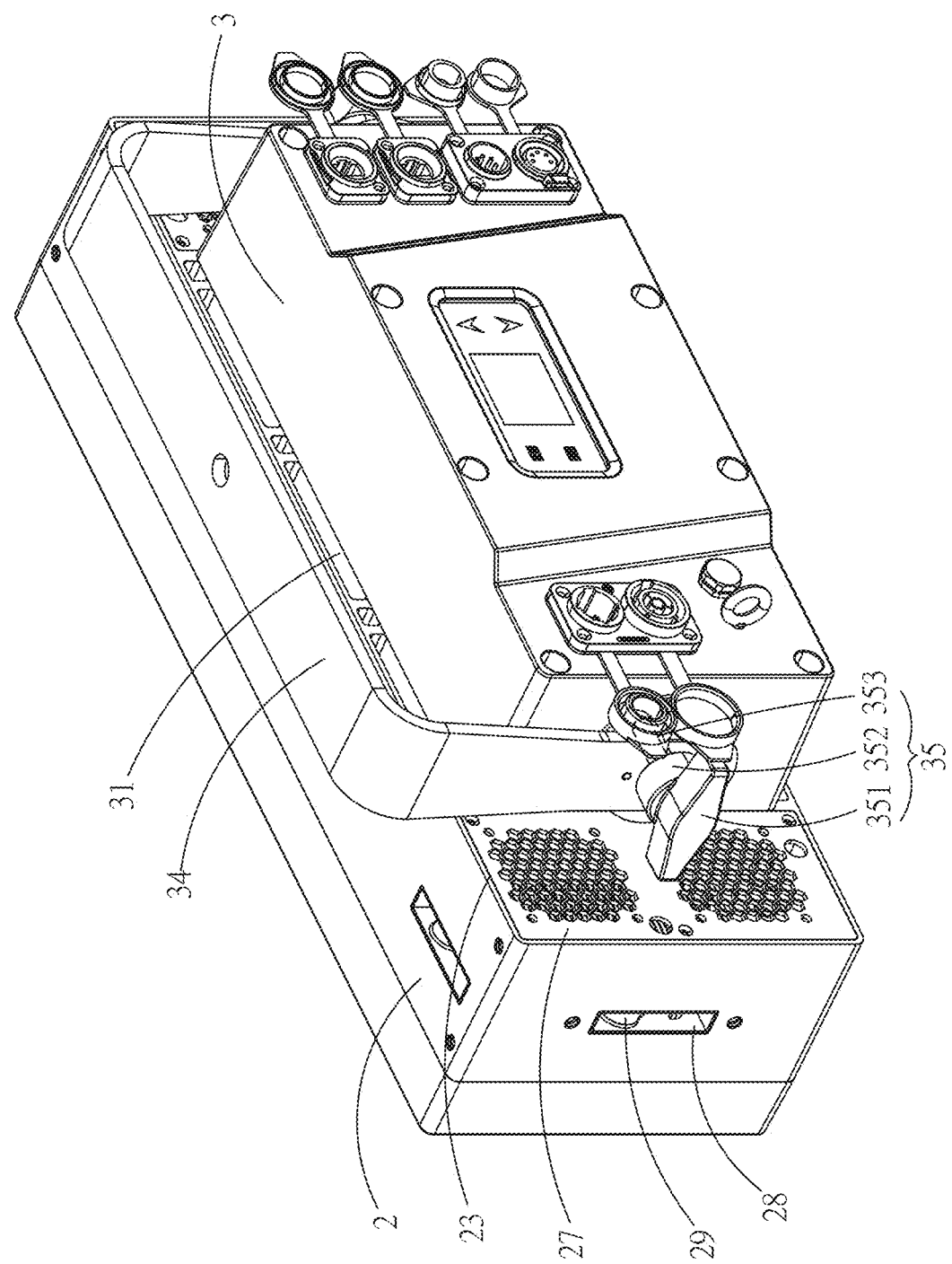
FIG. 3 is a perspective assembly view of the stage light with electronically adjustable lighting effects of the invention viewed from another angle.

First of all, please refer to FIGS. 1 to 3 respectively for a perspective assembly view of a stage light with electronically adjustable lighting effects of the invention; an exploded perspective view of the stage light with electronically adjustable lighting effects of the invention; and a perspective assembly view of the stage light with electronically adjustable lighting effects of the invention viewed from another angle, wherein a stage light 1 comprises a light box 2, a dimmable glass 26 and a control box 3.

Wherein a front accommodating chamber 21 is formed inside the light box 2, and a heat dissipation mechanism 22 is disposed in the front accommodating chamber 21 of the light box 2. The heat dissipation mechanism 22 comprises a heat-conducting plate 221, a heat-dissipating module 222 and at least one heat-dissipating fan 223. At least one heat dissipation hole 23 is formed on a rear side of the light box 2, a light-emitting side 24 is formed on a front side of the light box 2, a light panel 25 is disposed in the light box 2 at a position of the light-emitting side 24, and the light panel 25 can be an LED light or a projection light. The heat-conducting plate 221 is attached to the light panel 25, the heat-dissipating module 222 is attached to another side of the heat-conducting plate 221 opposite to the light panel 25, the heat-dissipating fan 223 is disposed on a front side of the heat dissipation hole 23, the heat-conducting plate 221 absorbs a heat energy of the light panel 25 and transmits the heat energy to the heat-dissipating module 222, and the heat-dissipating fan 223 discharges the heat energy of the heat-dissipating module 222 through the heat dissipation hole 23.

Figure 4:
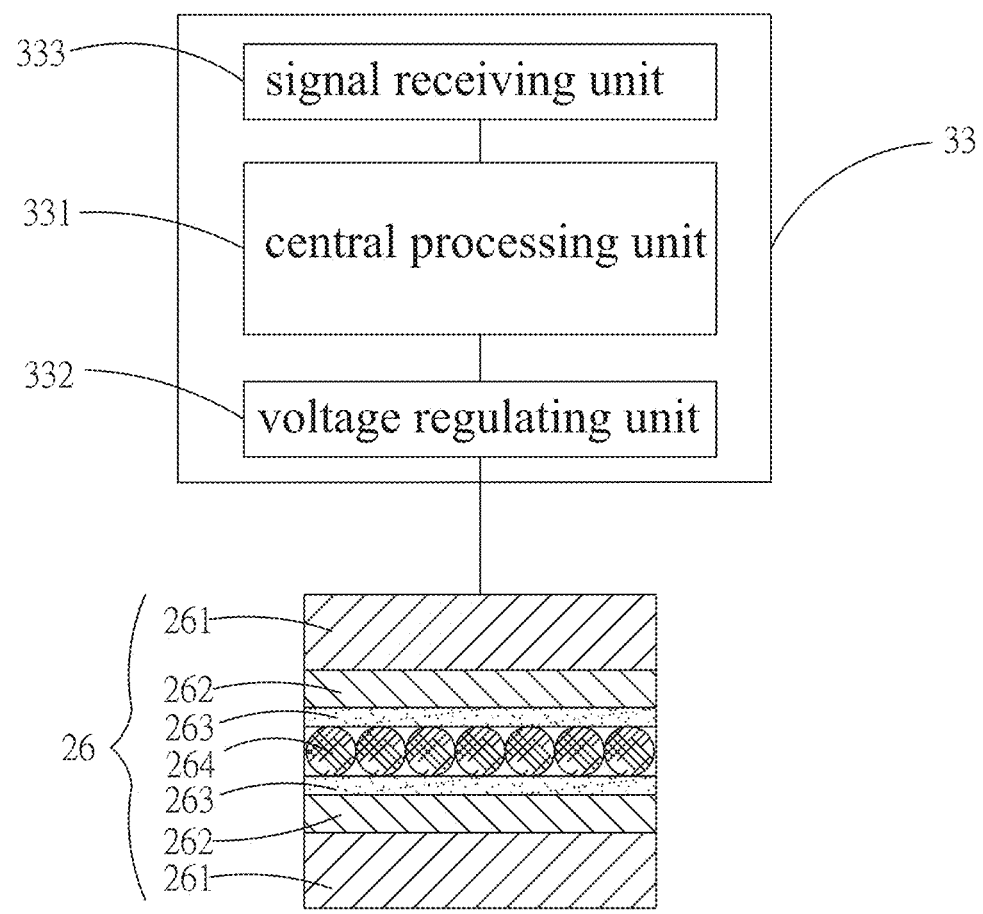
FIG. 4 is a schematic diagram of a control circuit and a dimmable glass of the stage light with electronically adjustable lighting effects of the invention.

Please refer to FIG. 4 for a schematic diagram of a control circuit and a dimmable glass of the stage light with electronically adjustable lighting effects of the invention, wherein the dimmable glass 26 is disposed on a front side of the light panel 25 and adjacent to the light-emitting side 24, a thickness of the dimmable glass 26 is between 2 mm and 26 mm, and the dimmable glass 26 comprises at least one outer glass layer 261, at least one dimming layer 262, at least one electroconductive coating layer 263, and a plurality of liquid crystal molecules 264. In this embodiment, the outer glass layer 261, the dimming layer 262 and the electroconductive coating layer 263 are respectively provided with two layers. The dimming layer 262 is attached to the outer glass layer 261, the electroconductive coating layer 263 is electrically connected to a voltage regulating unit 332 and attached to another side of the dimming layer 262 opposite to the outer glass layer 261, and the liquid crystal molecules 264 are disposed between the electroconductive coating layers 263. A thickness of the outer glass layer 261 is between 1.2 mm and 12 mm, and thicknesses of the liquid crystal molecules 264, the dimming layer 262 and the electroconductive coating layer 263 are respectively between 0.6 mm and 2

Wherein the control box 3 is disposed on the rear side of the light box 2, at least one air inlet channel 31 is formed between an upper side of the light box 2 and a lower side of the control box 3, the air inlet channel 31 communicates with the front accommodating chamber 21, and the air inlet channel 31 is used for air outside of the light box 2 to enter the front accommodating chamber 21. A rear accommodating chamber 32 is formed in the control box 3, a control circuit 33 is disposed in the control box 3, the control circuit 33 is electrically connected to the dimmable glass 26, and the control circuit 33 is provided with a central processing unit 331, the voltage regulating unit 332 and a signal receiving unit 333 that are electrically connected to one another, wherein the signal receiving unit 333 can be wired or wireless, and the control circuit 33 is electrically connected to the dimmable glass 26 via the voltage regulating unit 332.

Wherein the heat-conducting plate 221 is a metal plate with good heat-conducting effect, a periphery of the heat-conducting plate 221 can be fixed on an inner wall of the light box 2, and the light panel 25 is assembled on the heat-conducting plate 221, so that the light panel 25 can be stably installed in the front accommodating chamber 21. Heat energy generated by the light panel 25 is effectively conducted to the heat-conducting plate 221, and assembly relationship between the light panel 25 and the heat-conducting plate 221 assembling with each other and fixed in the front accommodating chamber 21 is capable of effectively reducing accuracy requirement of assembly between the light panel 25 and the light box 2. In addition, the heat-dissipating module 222 formed of a plurality of heat sinks is attached to another side of the heat-conducting plate 221 opposite to the light panel 25 to be capable of effectively increasing a heat dissipation area of the heat-conducting plate 221, thereby increasing an efficiency of the heat-conducting plate 221 in conducting heat energy of the light panel 25 into the front accommodating chamber 21. When the heat-dissipating fan 223 rotates, heat in the front accommodating chamber 21 can be blown to outside of the light box 2 via the heat dissipation hole 23, and at the same time, inside of the front accommodating chamber 21 is in a negative pressure state relative to the outside of the light box 2, so air outside the light box 2 will enter the front accommodating chamber 21 via the air inlet channel 31, thereby air in the front accommodating chamber 21 can be kept in circulation and heat dissipation effect can be improved.

Figure 5A:
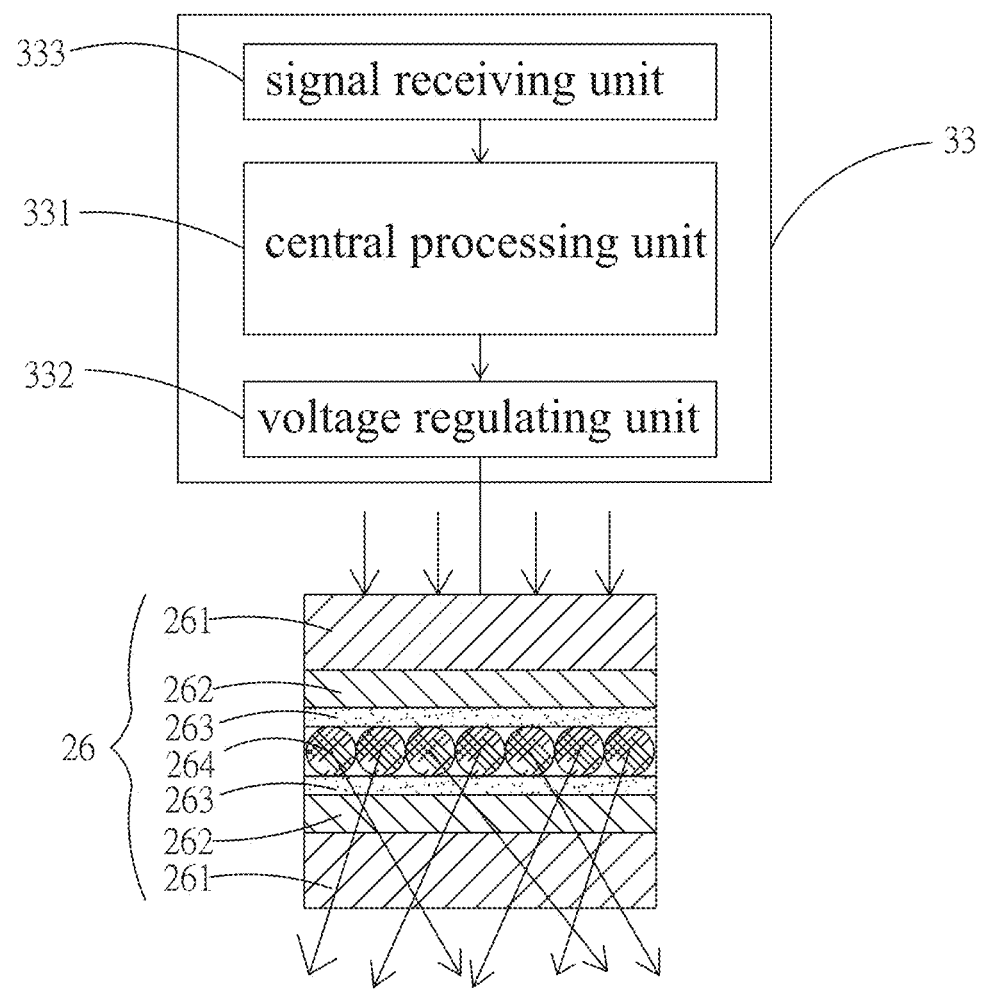
FIG. 5A is a first schematic diagram of implementation of the control circuit and the dimmable glass of the stage light with electronically adjustable lighting effects of the invention.
Figure 5B:
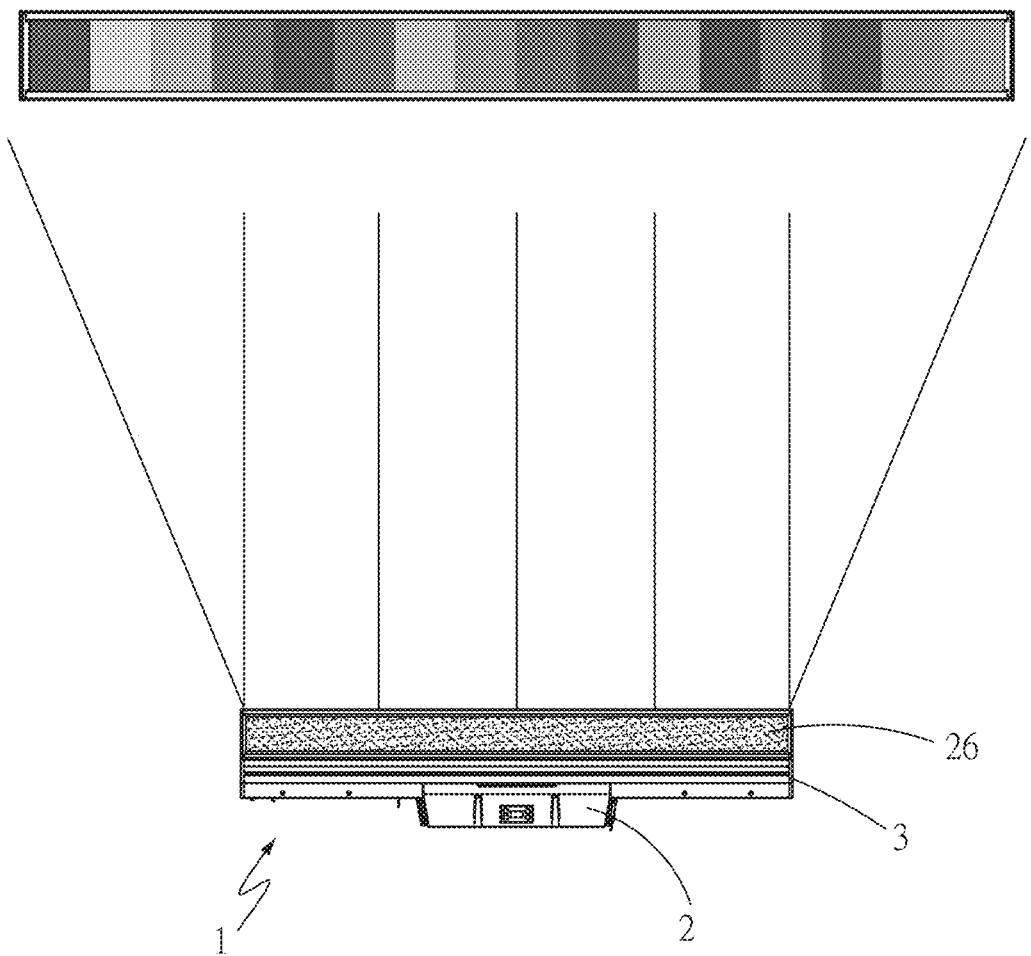
FIG. 5B is a schematic diagram of heavy atomization state of the stage light with electronically adjustable lighting effects of the invention.

In addition, the control box 3 is not only disposed on the rear side of the light box 2, a front end of the control box 3 is embedded inside the light box 2, and a passage between the light box 2 and the control box 3 is the air inlet channel 31, the air inlet channel 31 directly communicates with the front accommodating chamber 21, so that when the heat-dissipating fan 223 rotates, heat in the front accommodating chamber 21 can be blown to outside of the light box 2 via the heat dissipation hole 23, and at the same time, inside of the front accommodating chamber 21 is in a negative pressure state relative to the outside of the light box 2, so air outside the light box 2 will enter the front accommodating chamber 21 via the air inlet channel 31, thereby air in the front accommodating chamber 21 can be kept in circulation and heat dissipation effect can be improved, and an overall length of the stage light 1 can be reduced through combination relationship between the control box 3 and the light box 2 in order to reduce a space occupied by installation of the stage light 1.

Wherein a light transmittance of the dimmable glass 26 can be controlled by whether being energized or not and by voltage adjustment, that is, a degree of atomization of the dimmable glass 26 can be adjusted. In this embodiment, if the voltage regulating unit 332 has not energized the dimmable glass 26, the liquid crystal molecules 264 of the dimmable glass 26 are irregularly arranged, so the dimmable glass 26 is atomized and has low light transmittance. Therefore, when a light source of the light panel 25 passes through the dimmable glass 26, an illumination angle is 45.9 degrees, when a user wants to change a light transmittance of the dimmable glass 26, the user can use a wired or wireless controller to generate a digital multiplexing signal S1. When the signal receiving unit 333 receives the digital multiplexing signal S1 transmitted by wire or wireless, the signal receiving unit 333 transmits the digital multiplexing signal S1 to the central processing unit 331. The central processing unit 331 generates a voltage adjustment command C1 through the digital multiplexing signal S1 and transmits the voltage adjustment command C1 to the voltage regulating unit 332. The voltage regulating unit 332 energizes the dimmable glass 26 through the voltage adjustment command C1, and an output voltage is adjusted by the voltage adjustment command C1. When the liquid crystal molecules 264 receive different voltages, an arrangement of the liquid crystal molecules 264 will change, and changes in the arrangement of the liquid crystal molecules 264 are capable of changing a light transmittance of the dimmable glass 26. As shown in FIGS. 5A and 5B, when the dimmable glass 26 is not energized, the dimmable glass 26 is in a heavily atomized state; therefore, a light source emitted by the light panel 25 has a large heavily atomized refraction angle because the dimmable glass 26 is heavily atomized, and colors of the light source are completely diffused.

Figure 6A:
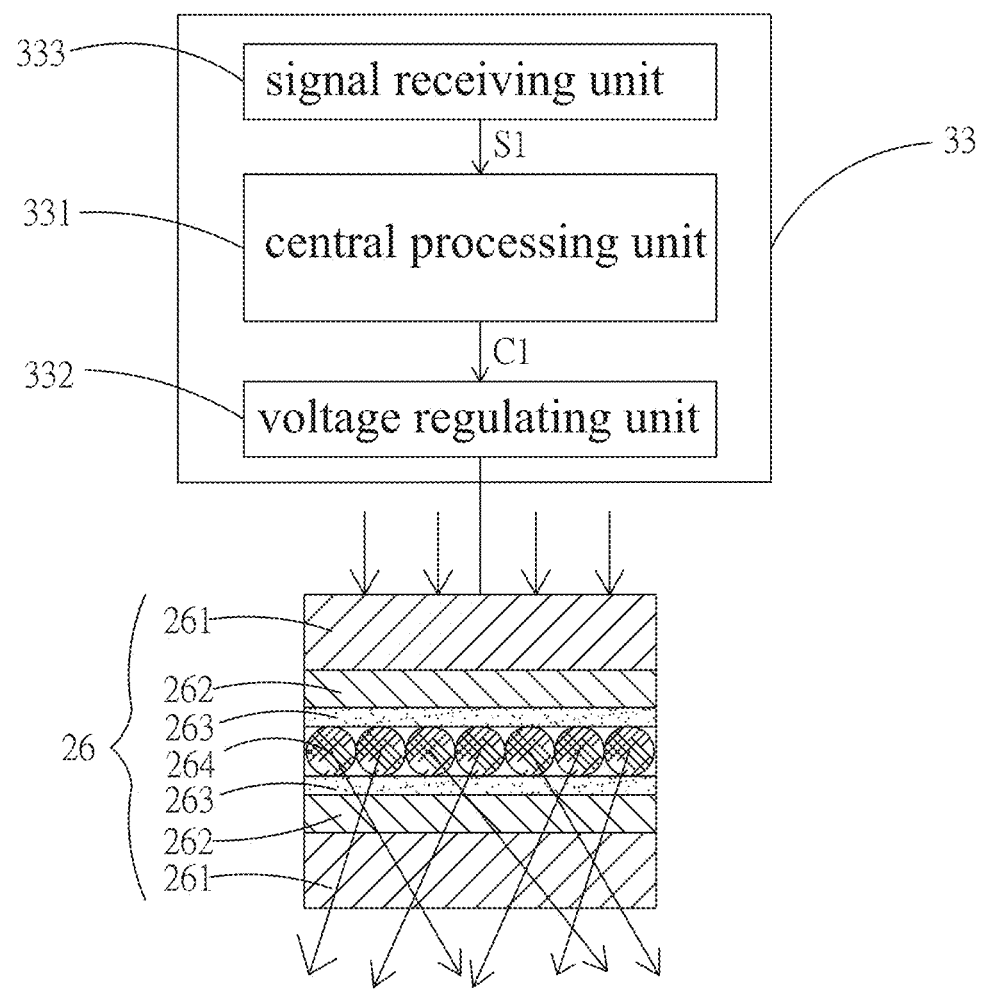
FIG. 6A is a second schematic diagram of implementation of the control circuit and the dimmable glass of the stage light with electronically adjustable lighting effects of the invention.
Figure 6B:
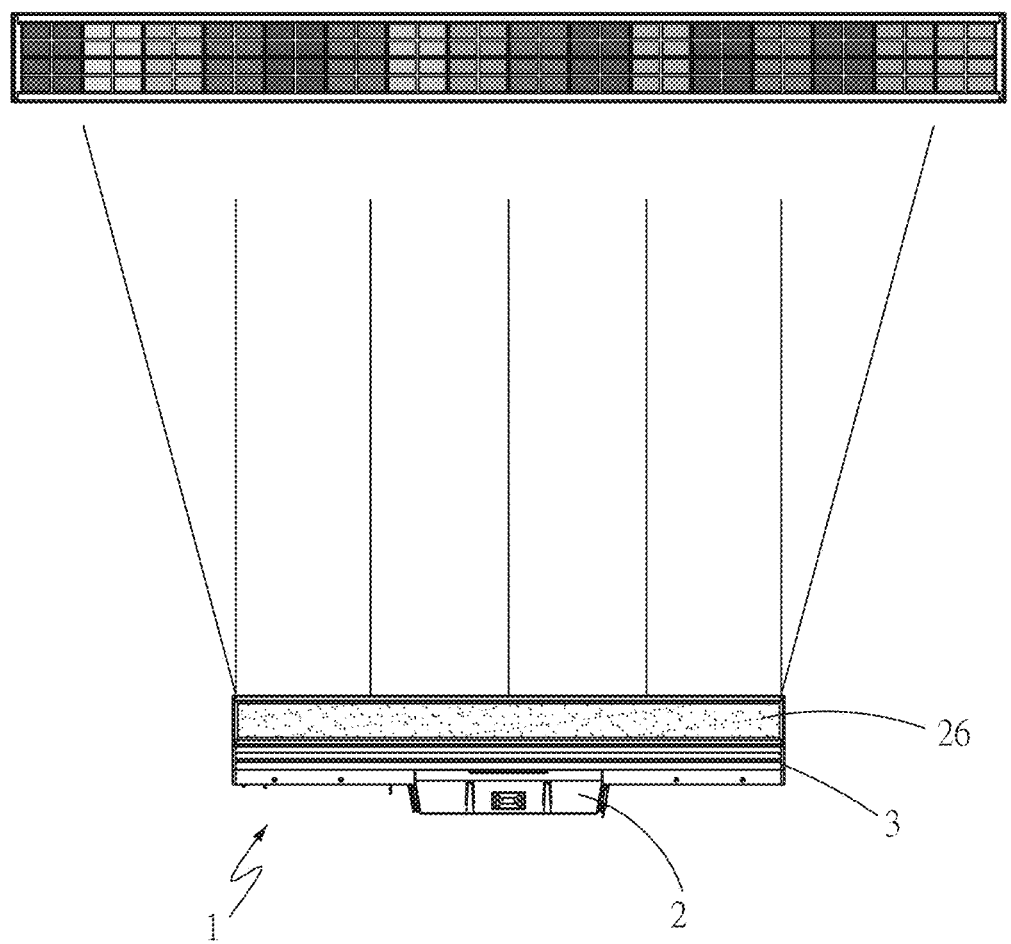
FIG. 6B is a schematic diagram of light atomization state of the stage light with electronically adjustable lighting effects of the invention.
Figure 7A:
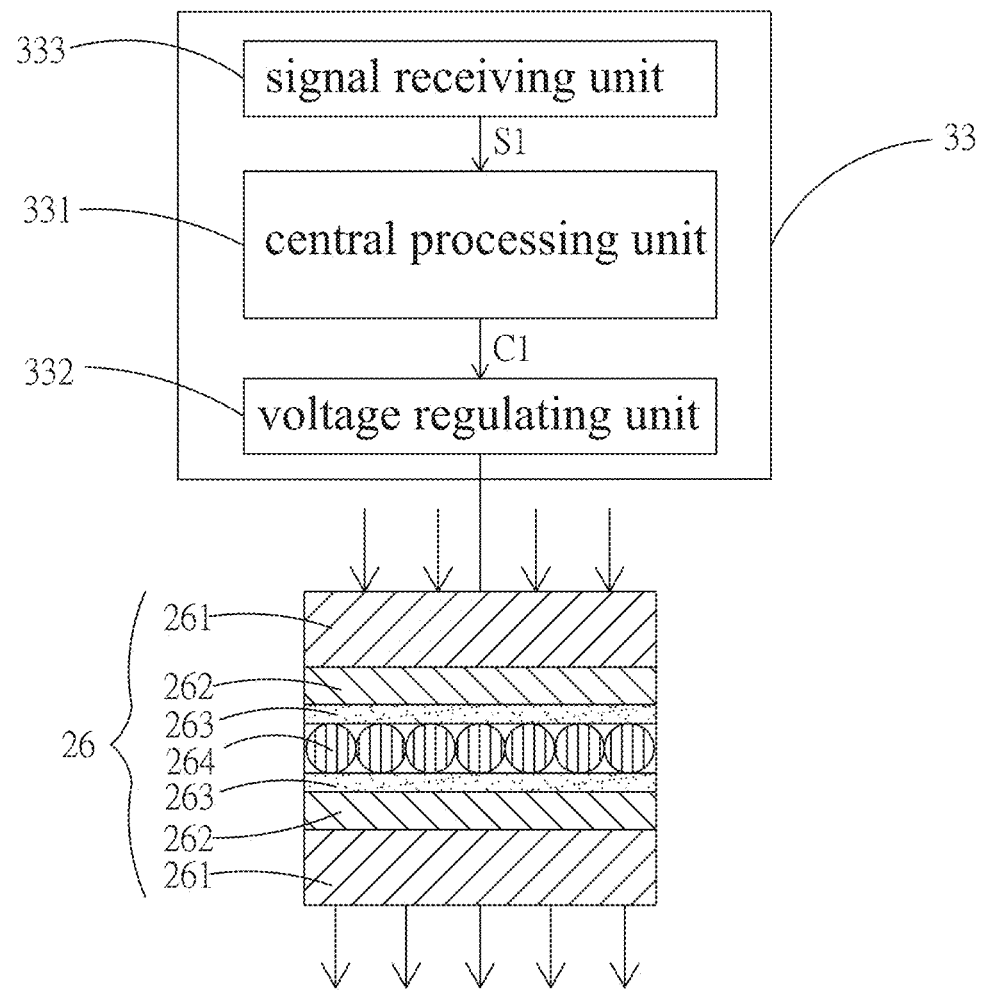
FIG. 7A is a third schematic diagram of implementation of the control circuit and the dimmable glass of the stage light with electronically adjustable lighting effects of the invention.
Figure 7B:
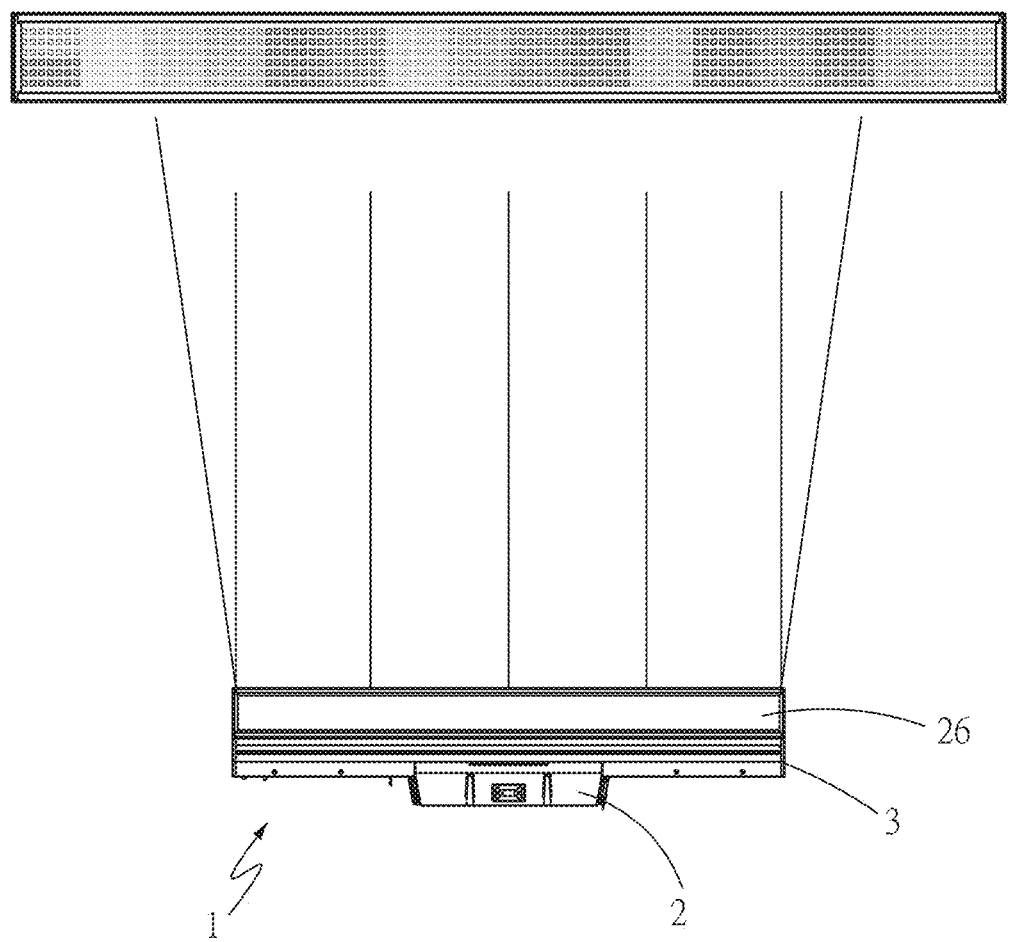
FIG. 7B is a schematic diagram of transparent state of the stage light with electronically adjustable lighting effects of the invention.

As shown in FIGS. 6A and 6B, when the voltage regulating unit 332 energizes the dimmable glass 26 via the voltage adjustment command C1 and regulates an output voltage to increase gradually, the liquid crystal molecules 264 of the dimmable glass 26 are gradually arranged, so that the dimmable glass 26 changes to a lightly atomized state; therefore, a light source emitted by the light panel 25 has a lightly atomized refraction angle reduced to less than 45.9 degrees because the dimmable glass 26 is lightly atomized, and colors of the light source are lightly diffused. As shown in FIGS. 7A and 7B, until the voltage regulating unit 332 energizes the dimmable glass 26 via the voltage adjustment command C1 and regulates an output voltage to 60V, the liquid crystal molecules 264 of the dimmable glass 26 are completely arranged in order, so that the dimmable glass 26 is transformed into a transparent state. So a light source emitted by the light panel 25 has a further reduced refraction angle because the dimmable glass 26 is clear, and colors of the light source are almost emitted directly. The voltage regulating unit 332 is capable of controlling a light source of the light panel 25 through voltage adjustment between 0V and 60V, and an illumination angle of the light source can be controlled between 3 degrees and 60 degrees through a light transmittance of the dimmable glass 26, thereby the control circuit 33 is capable of directly controlling an arrangement of the liquid crystal molecules 264 through changes in voltage in order to change a light transmittance of the dimmable glass 26, and therefore achieving efficacies of solving the trouble of manual disassembly and assembly and capable of displaying changes of the light source instantly by directly controlling a degree of glass atomization.

Figure 8:
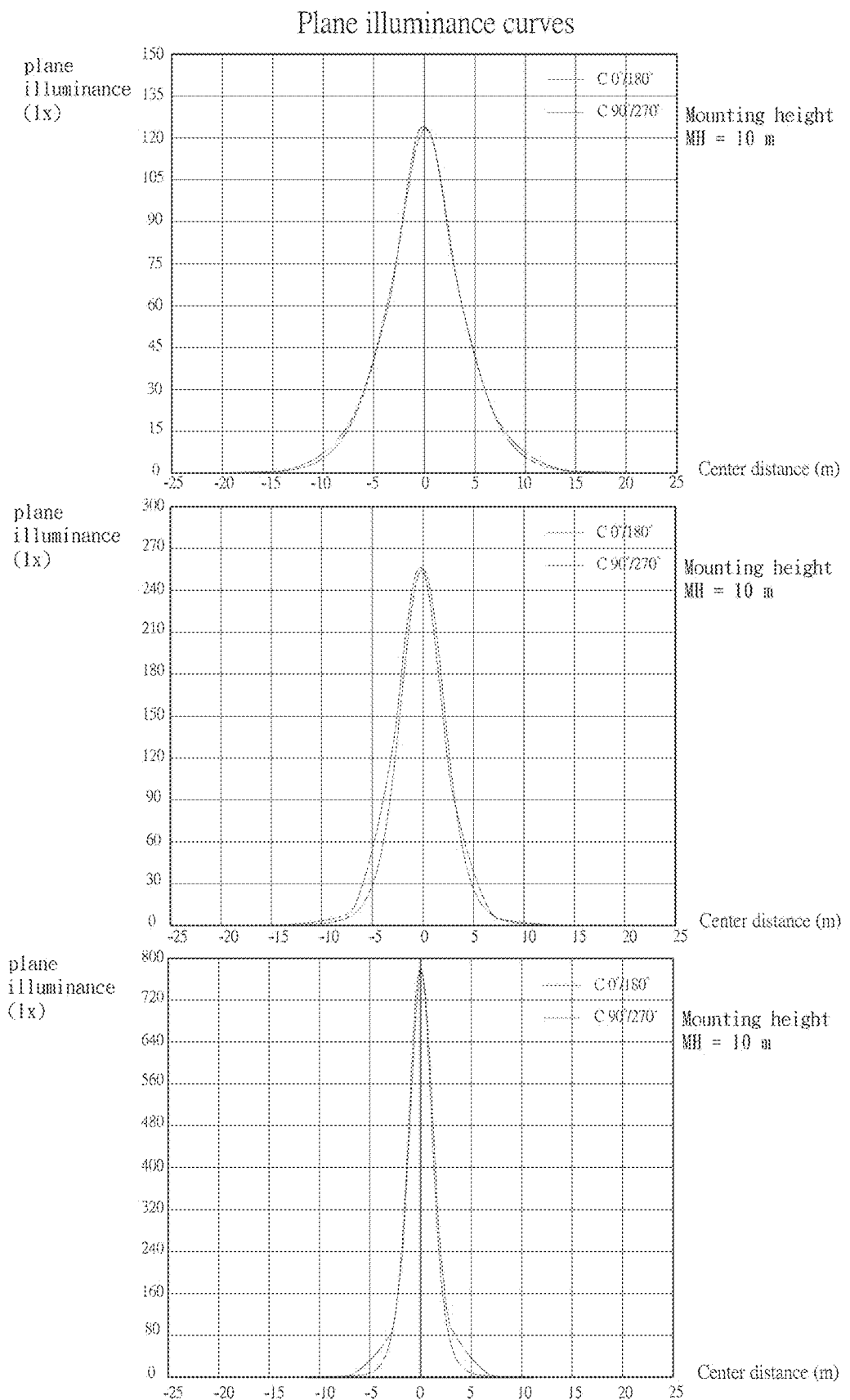
FIG. 8 shows graphs of plane illuminance test curves of the stage light with electronically adjustable lighting effects of the invention.

Please refer to FIG. 8, which shows graphs of plane illuminance test curves of the stage light 1 with electronically adjustable lighting effects of the invention, wherein plane illuminance test curves of the stage light 1 with different light transmittances are shown, in each of the test curves, red line is a horizontal plane (C=0° and C=180°), blue line is a vertical plane (C=90° and C=270°), the upper plane illuminance test curve is in a heavily atomized state, the middle plane illuminance test curve is in a lightly atomized state, and the lower plane illuminance test curve is in a transparent state. When the dimmable glass 26 is in the heavily atomized state, the plane illuminance is lower than that in the lightly atomized state, and the plane illuminance in the lightly atomized state is lower than that in the transparent state.

In addition, as shown in FIG. 3, at least one shielding grid member 27 can be disposed on an outer side of the light box 2. In this embodiment, the shielding grid member 27 is disposed at a position of the heat dissipation hole 23 to cover the heat dissipation hole 23, and the shielding grid member 27 is capable of effectively preventing foreign objects from entering the front accommodating chamber 21 from the heat dissipation hole 23, and providing an effect of protecting the heat dissipation mechanism 22 and the light panel 25.

In addition, at least one recess 28 and at least one hook 29 are formed on a side of the light box 2, the hook 29 is accommodated in the recess 28, when the light box 2 is to be hung at a mounting position, the hook 29 can be turned out from the recess 28 and the stage light 1 can be hung at the mounting position through the hook 29. When the hook 29 is not in use, the hook 29 can be rotated back into the recess 28 to improve an overall aesthetics of the stage light 1.

In addition, a handle 34 is provided on a top of the control box 3, two ends of the handle 34 are assembled on two sides of the control box 3, and the control box 3 is provided with at least one locking member 35 on a side of the handle 34. The locking member 35 comprises a rotating knob 351, a pressing member 352 and a rotating stud 353, the handle 34 can be sleeved on the rotating stud 353, and the rotating stud 353 is assembled with a screw thread on a side of the control box 3. When the rotating knob 351 is rotated forwardly, the rotating knob 351 drives the rotating stud 353 to be screwed on the side of the control box 3, and at the same time, the pressing member 352 presses the handle 34 against the side of the control box 3 firmly, so that the handle 34 is fixedly disposed on the control box 3. On the contrary, when the rotating knob 351 is rotated reversely, the rotating knob 351 drives the rotating stud 353 to rotate away from the side of the control box 3, and at the same time, the pressing member 352 separates the handle 34 from the side of the control box 3, so that the handle 34 can be rotated on the control box 3. In this way, the stage light 1 can be conveniently fetched and moved through the handle 34, and a relative position between the handle 34 and the control box 3 can be adjusted effectively, so that an illumination direction of the light panel 25 can be controlled through a position of the handle 34, which can save the need to use additional equipment to fix an illumination direction of the light panel 25.

It is to be understood that the above description is only preferred embodiments of the invention and is not used to limit the invention, and changes in accordance with the concepts of the invention may be made without departing from the spirit of the invention, for example, the equivalent effects produced by various transformations, variations, modifications and applications made to the configurations or arrangements shall still fall within the scope covered by the appended claims of the invention.

What is claimed is:

1. A stage light with electronically adjustable lighting effects, comprising:
    a light box, inside the light box being formed with a front accommodating chamber and a heat dissipation mechanism being disposed in the front accommodating chamber, two heat dissipation holes being separately formed on a rear side of the light box to communicate with the heat dissipation mechanism, a light-emitting side being formed on a front side of the light box and a light panel being disposed at a position of the light-emitting side;
    a dimmable glass with a thickness between 2 mm and 26 mm being disposed on a front side of the light panel, the dimmable glass comprising a pair of glass layers and a plurality of liquid crystal molecules, the liquid crystal molecules being disposed between the pair of glass layers;
    a control box, the control box being disposed on the rear side of the light box, a rear accommodating chamber being formed in the control box, a control circuit electrically connected to the dimmable glass being disposed in the rear accommodating chamber, the control circuit being provided with a central processing unit, a voltage regulating unit and a signal receiving unit electrically connected to one another, the signal receiving unit receiving a digital multiplexing signal and transmitting the digital multiplexing signal to the central processing unit, the central processing unit generating a voltage adjustment command through the digital multiplexing signal and transmitting the voltage adjustment command to the voltage regulating unit, the voltage regulating unit controlling an arrangement of the liquid crystal molecules through the voltage adjustment command to change a light transmittance of the dimmable glass, so that an illumination angle of a light source of the light panel being controlled to be between 3 degrees and 60 degrees by the light transmittance of the dimmable glass, and the heat dissipation mechanism discharging a heat energy generated by the light panel through the heat dissipation hole; and
    a controller, the controller is electrically wired or wirelessly connected to the control box, and the controller generates the digital multiplexing signal.

2. The stage light with electronically adjustable lighting effects as claimed in claim 1, wherein the heat dissipation mechanism comprises a heat-conducting plate, a heat-dissipating module and at least one heat-dissipating fans, the heat-conducting plate is attached to the light panel, and the heat-dissipating module is attached to another side of the heat-conducting plate opposite to the light panel.

3. The stage light with electronically adjustable lighting effects as claimed in claim 2, wherein the heat-dissipating fan is disposed on a front side of the heat dissipation hole, the heat-conducting plate absorbs a heat energy of the light panel and transmits the heat energy to the heat-dissipating module, and the heat-dissipating fan discharges the heat energy of the heat-dissipating module through the heat dissipation hole.

4. The stage light with electronically adjustable lighting effects as claimed in claim 3, wherein the rear side of the light box is provided with two shielding grid members at a position of each heat dissipation hole of the two heat dissipation holes.

5. The stage light with electronically adjustable lighting effects as claimed in claim 1, wherein at least one air inlet channel is formed between an upper side of the light box and a lower side of the control box, and the air inlet channel communicates with the front accommodating chamber.

6. The stage light with electronically adjustable lighting effects as claimed in claim 1, wherein the dimmable glass further comprises a dimming layer and an electroconductive coating layer, the dimming layer is attached to any one glass layer of the pair of glass layers, and the electroconductive coating layer is electrically connected to the voltage regulating unit and attached to the dimming layer that is opposite to the one glass layer of the pair of glass layers, and the liquid crystal molecules are disposed between the electroconductive coating layers.

7. The stage light with electronically adjustable lighting effects as claimed in claim 6, wherein a thickness of any one glass layer of the pair of glass layers is between 1.2 mm and 12 mm, thicknesses of the liquid crystal molecules, the dimming layer and the electroconductive coating layer are respectively between 0.6 mm and 2 mm, and a voltage adjustment range of the voltage regulating unit is between 0V and 60V.

8. The stage light with electronically adjustable lighting effects as claimed in claim 1, wherein a handle is provided on a top of the control box, and two ends of the handle are assembled on two sides of the control box.

9. The stage light with electronically adjustable lighting effects as claimed in claim 8, wherein at least one locking member is disposed on a side of the handle, and the locking member comprises a rotating knob, a pressing member and a rotating stud.

10. The stage light with electronically adjustable lighting effects as claimed in claim 1, wherein at least one recess and at least one hook are formed on a side of the light box, and the hook is accommodated in the recess.

\* \* \* \* \*